(12) United States Patent
Kousaka et al.

(10) Patent No.: US 11,267,953 B2
(45) Date of Patent: *Mar. 8, 2022

(54) ISO(THIO)CYANATE COMPOSITION, AND RESIN COMPOSITION INCLUDING SAME FOR OPTICAL MEMBER

(71) Applicant: HOYA LENS THAILAND LTD., Pathumthani (TH)

(72) Inventors: Masahisa Kousaka, Tokyo (JP); Natsumi Tasaki, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 93 days.

This patent is subject to a terminal disclaimer.

(21) Appl. No.: 16/721,999

(22) Filed: Dec. 20, 2019

(65) Prior Publication Data

US 2020/0123345 A1 Apr. 23, 2020

Related U.S. Application Data

(63) Continuation of application No. 15/557,223, filed as application No. PCT/JP2016/057807 on Mar. 11, 2016, now Pat. No. 10,544,283.

(30) Foreign Application Priority Data

Mar. 12, 2015 (JP) .................................. 2015-049427

(51) Int. Cl.
| | |
|---|---|
| C08L 75/04 | (2006.01) |
| C08K 5/521 | (2006.01) |
| G02C 7/02 | (2006.01) |
| G02B 1/04 | (2006.01) |
| C08G 18/38 | (2006.01) |
| C08G 18/76 | (2006.01) |

(52) U.S. Cl.
CPC .......... *C08K 5/521* (2013.01); *C08G 18/3876* (2013.01); *C08G 18/3885* (2013.01); *C08G 18/7642* (2013.01); *C08L 75/04* (2013.01); *G02B 1/04* (2013.01); *G02B 1/041* (2013.01); *G02C 7/02* (2013.01)

(58) Field of Classification Search
CPC ................ C08K 5/521; C08G 18/3885; C08G 18/3876; C08G 18/7642; C08G 18/38; C08L 75/04; G02B 1/04; G02B 1/0421; G02C 7/02
USPC ........................................................ 524/710
See application file for complete search history.

(56) References Cited

U.S. PATENT DOCUMENTS

| | | | |
|---|---|---|---|
| 5,962,561 A | 10/1999 | Turshani et al. | |
| 10,144,796 B2 | 12/2018 | Iijima | |
| 10,544,283 B2 * | 1/2020 | Kousaka | C08G 18/3876 |
| 2009/0259001 A1 | 10/2009 | Kousaka | |
| 2009/0264613 A1 | 10/2009 | Kuma et al. | |
| 2010/0234498 A1 | 9/2010 | Iwazumi et al. | |
| 2011/0251301 A1 | 10/2011 | Bos et al. | |
| 2013/0158291 A1 * | 6/2013 | Pirkl | B29B 7/7404 560/336 |
| 2014/0200323 A1 | 7/2014 | Itoh et al. | |
| 2014/0296431 A1 | 10/2014 | Kousaka | |
| 2015/0331147 A1 | 11/2015 | Ryu et al. | |
| 2017/0355106 A1 | 12/2017 | Okazaki et al. | |
| 2018/0297943 A1 | 10/2018 | Kageyama et al. | |
| 2018/0362699 A1 | 12/2018 | Kageyama et al. | |

FOREIGN PATENT DOCUMENTS

| | | |
|---|---|---|
| JP | S60-199016 A | 10/1985 |
| JP | H03-281312 A | 12/1991 |
| JP | H11-012959 A | 1/1999 |
| JP | 2000-191673 A | 7/2000 |
| JP | 2001/505232 A | 4/2001 |
| JP | 3222182 B2 | 10/2001 |
| JP | 2002-121379 A | 4/2002 |
| JP | 2002-348348 A | 12/2002 |
| JP | 2003-175516 A | 6/2003 |
| JP | 2005-081772 A | 3/2005 |
| WO | 98/03582 A1 | 1/1998 |
| WO | 2007/105355 A1 | 9/2007 |
| WO | 2007/129450 A1 | 11/2007 |
| WO | 2008/023690 A1 | 2/2008 |
| WO | 2008/026727 A1 | 3/2008 |
| WO | 2010/043392 A1 | 4/2010 |
| WO | 2013/002409 A1 | 1/2013 |
| WO | 2013/024863 A1 | 2/2013 |
| WO | 2013/032010 A1 | 3/2013 |
| WO | 2014/077369 A1 | 5/2014 |
| WO | 2016/104744 A1 | 6/2016 |

OTHER PUBLICATIONS

May 17, 2016 International Search Report issued in International Patent Application No. PCT/JP2016/057807.
Johoku Chemical, "Product List—Acid Phosphates"—www.johoku-chemical.com/details/products02.html, retrieved on Apr. 11, 2017.

* cited by examiner

*Primary Examiner* — Hannah J Pak
(74) *Attorney, Agent, or Firm* — Oliff PLC

(57) ABSTRACT

An iso(thio)cyanate composition for an optical component has excellent storage stability. The iso(thio)cyanate composition includes an iso(thio)cyanate compound having two or more iso(thio)cyanate groups in a molecule, a phosphoric acid ester compound represented by general formula (1), and a phosphoric acid ester compound represented by general formula (2). A total amount of the phosphoric acid ester compounds is 1 ppm or greater and less than 25,000 ppm, based on the mass of the iso(thio)cyanate compound. A molar ratio of the phosphoric acid ester compound represented by general formula (1) and the phosphoric acid ester compound represented by general formula (2) is 30/70 to 70/30.

15 Claims, No Drawings

ISO(THIO)CYANATE COMPOSITION, AND RESIN COMPOSITION INCLUDING SAME FOR OPTICAL MEMBER

CROSS REFERENCE TO RELATED APPLICATIONS

This is a Continuation of application Ser. No. 15/557,223 filed Sep. 11, 2017, which in turn is a national stage of PCT/JP2016/057807 filed Mar. 11, 2016, which claims priority to JP 2015-049427 filed Mar. 12, 2015. The disclosure of the prior applications is hereby incorporated by reference herein in its entirety.

TECHNICAL FIELD

The present disclosure relates to an iso(thio)cyanate composition, a resin composition for an optical component obtained by using the iso(thio)cyanate composition, an optical component prepared by using the resin composition for an optical component, and a spectacle lens composed of the optical component.

BACKGROUND ART

It is known that a resin for a plastic lens having a high refractive index can be obtained by polymerizing a polyisocyanate compound and a polythiol compound. For example, PTL 1 discloses a method for producing a polyurethane plastic lens having a high refractive index by heating and curing a composition obtained by mixing an aliphatic polyisocyanate compound and an aliphatic polythiol compound such as pentaerythritol tetrakis(thioglycolate) and trimethylolpropane tris(thioglycolate).

Isocyanate compounds are unstable and react relatively easily with an active hydrogen compound due to a high reactivity demonstrated by the isocyanate group. Particularly problematic is the reaction of isocyanate compounds with moisture in the atmosphere. An isocyanate compound which has reacted with moisture in the atmosphere becomes cloudy or colored. For this reason, it is necessary to add a stabilizer in order to store the isocyanate compound. For example, PTL 2 discloses a plastic lens using a phenol as a stabilizer as a plastic lens which is required to be colorless, transparent and homogeneous, the lens being composed of an optical urethane resin having little coloration, high total light transmittance, and no optical distortion.

CITATION LIST

Patent Literature

[PTL 1] Japanese Patent Application Publication No. S60-199016
[PTL 2] Japanese Patent No. 3222182

SUMMARY

Technical Problem

Although a certain effect can be obtained when a phenol is used to stabilize an isocyanate compound as described in PTL 2, depending on the type of the isocyanate compound (for example, an isocyanate compound having a particularly highly reactive aromatic ring and the like) or storage conditions of the isocyanate compound, clouding still may occur in the isocyanate compound, or a polymer obtained by polymerization of the isocyanate compound, after storage for a certain period of time.

Accordingly, it is an objective of an embodiment of the present disclosure to provide an iso(thio)cyanate composition having excellent storage stability, a resin composition for an optical component obtained by using the iso(thio) cyanate composition, an optical component prepared using the resin composition for an optical component, and a spectacle lens composed of the optical component.

Solution to Problem

As a result of comprehensive research conducted to solve the above-mentioned problems, the inventors of the present application have found that an iso(thio)cyanate compound can be stabilized by using a mixture of two predetermined types of phosphoric acid ester compounds as a stabilizer.

That is, one embodiment of the present disclosure is described below.

[1] An iso(thio)cyanate composition for an optical component, comprising: an iso(thio)cyanate compound having two or more iso(thio)cyanate groups in a molecule; a phosphoric acid ester compound represented by the following general formula (1); and a phosphoric acid ester compound represented by the following general formula (2), wherein a total amount of the phosphoric acid ester compounds is 1 ppm to 25,000 ppm, based on a mass of the iso(thio)cyanate compound:

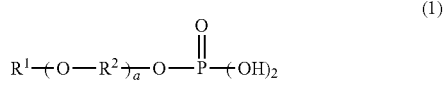

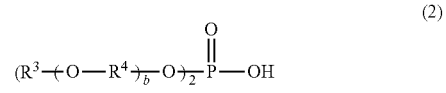

wherein, in general formula (1) and general formula (2), $R^1$ and $R^3$ each independently represent a $C_4$ to $C_{12}$ alkyl group, $R^2$ and $R^4$ each independently represent a $C_1$ to $C_4$ alkylene group, and a and b each independently represent an integer of 0 to 2.

[2] A resin composition for an optical component obtained by using the iso(thio)cyanate composition according to [1] hereinabove.

[3] An optical component prepared using the resin composition for an optical component according to [2] hereinabove.

[4] A spectacle lens comprising the optical component according to [3] hereinabove.

[5] A method for producing a spectacle lens, comprising:
a step 1 of mixing an iso(thio)cyanate compound having two or more iso(thio)cyanate groups in a molecule, a phosphoric acid ester compound represented by the following general formula (1), and a phosphoric acid ester compound represented by the following general formula (2), with a total amount of the phosphoric acid ester compounds being 1 ppm to 25,000 ppm, based on a mass of the iso(thio) cyanate compound;
a step 2 of mixing the mixture obtained in step 1, an active hydrogen compound having two or more active hydrogen groups, and a polymerization catalyst and obtaining a resin composition; and a step 3 of injecting the resin composition into a mold for a lens and polymerizing the resin composition.

Advantageous Effects of Invention

According to one embodiment of the present disclosure, it is possible to provide an iso(thio)cyanate composition having excellent storage stability, a resin composition for an optical component obtained by using the iso(thio)cyanate composition, an optical component prepared using the resin composition for an optical component, and a spectacle lens composed of the optical component.

DESCRIPTION OF EMBODIMENTS

[Iso(Thio)Cyanate Composition]

The iso(thio)cyanate composition of the present disclosure is an iso(thio)cyanate composition for an optical component, comprising: an iso(thio)cyanate compound having two or more iso(thio)cyanate groups in a molecule; a phosphoric acid ester compound represented by the following general formula (1); and a phosphoric acid ester compound represented by the following general formula (2), wherein a total amount of the phosphoric acid ester compounds is 1 ppm to 25,000 ppm, based on a mass of the iso(thio)cyanate compound. In the present description, "ppm" means the mass ratio unless otherwise specified.

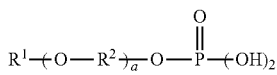

(1)

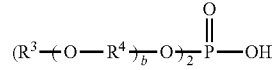

(2)

wherein, in general formula (1) and general formula (2), $R^1$ and $R^3$ each independently represent a $C_4$ to $C_{12}$ alkyl group, $R^2$ and $R^4$ each independently represent a $C_1$ to $C_4$ alkylene group, and a and b each independently represent an integer of 0 to 2.

<Iso(Thio)Cyanate Compound>

The iso(thio)cyanate compound having two or more iso(thio)cyanate groups in a molecule, which is used in the iso(thio)cyanate composition of the present disclosure, is not particularly limited as long as it can be used for preparing an optical component.

Incidentally, the iso(thio)cyanate group is at least one selected from an isocyanate group and an isothiocyanate group. The effects of the present disclosure are attained particularly advantageously with the isocyanate compound having an isocyanate group.

The upper limit value of the number of iso(thio)cyanate groups in the iso(thio)cyanate compound is not particularly limited as long as it is 2 or more. For example, this number may be 3.

As the iso(thio)cyanate compound, an iso(thio)cyanate compound having an aromatic ring may have better. Iso(thio)cyanate compounds having an aromatic ring are particularly reactive among iso(thio)cyanate compounds, and therefore easily deteriorate by reacting with moisture and the like in the atmosphere. However, this degradation can be suppressed by using a specific amount of the mixture of the phosphoric acid ester compounds as a stabilizer.

The iso(thio)cyanate compounds having an aromatic ring can be exemplified by phenylene diisocyanate, methylphenylene diisocyanate, bis(isocyanatomethyl)benzene, mesitylene triisocyanate, bis(isocyanatopropyl)benzene, diphenylmethane diisocyanate, diisocyanate naphthalene, (dimethylbiphenylylene) diisocyanate, and the like. These compounds may be used singly or in combination of two or more thereof. Of these, bis(isocyanatomethyl)benzene may have better.

Iso(thio)cyanate compounds having a cyclic structure may also have better as the iso(thio)cyanate compound. The iso(thio)cyanate compounds having a cyclic structure can be exemplified by bis(isocyanatomethyl)benzene, bis(isocyanatomethyl)cyclohexane, bis(4-isocyanatocyclohexyl)methane, isophorone diisocyanate, norbornanediylbis(methylene) diisocyanate, bis(isocyanatomethyl)dithiane, and the like. These compounds may be used singly or in combination of two or more thereof. Resins obtained by using these materials have relatively high strength and refractive index, and can be advantageously used for optical components. Among them, at least one selected from the group consisting of bis(isocyanatomethyl)benzene and norbornanediylbis(methylene) diisocyanate may have better, and norbornanediylbis(methylene) diisocyanate may have better.

<Phosphoric Acid Ester Compounds>

The phosphoric acid ester compounds used in the iso(thio)cyanate composition of the present disclosure include a phosphoric acid ester compound represented by the following general formula (1) and a phosphoric acid ester compound represented by the following general formula (2),

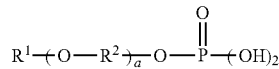

(1)

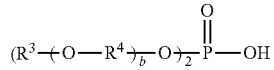

(2)

wherein, in general formula (1) and general formula (2), $R^1$ and $R^3$ each independently represent a $C_4$ to $C_{12}$ alkyl group, $R^2$ and $R^4$ each independently represent a $C_1$ to $C_4$ alkylene group, and a and b each independently represent an integer of 0 to 2 and may be an integer of 1 or 2.

$R^1$ and $R^3$ may be each independently a $C_4$ to $C_8$ alkyl group, or a $C_4$ to $C_6$ alkyl group. Examples of $R^1$ and $R^3$ include a butyl group, a pentyl group, a hexyl group, an octyl group and the like. Of these, a butyl group may have better.

$R^2$ and $R^4$ may be each independently a $C_2$ to $C_4$ alkylene group.

Examples of $R^2$ and $R^4$ include an ethanediyl group, a propanediyl group, a butanediyl group and the like.

The phosphoric acid ester compounds used in the iso(thio)cyanate composition of the present disclosure may be a phosphoric acid ester compound represented by a following formula (3) and a phosphoric acid ester compound represented by a following formula (4) in order to improve storage stability.

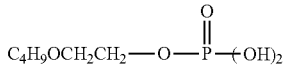

(3)

-continued

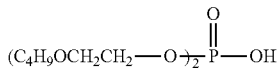
(4)

When the iso(thio)cyanate composition of the present disclosure includes the phosphoric acid ester compound represented by general formula (1) and the phosphoric acid ester compound represented by general formula (2), the iso(thio)cyanate compound contained in the iso(thio)cyanate composition of the present disclosure can be stabilized.

The total amount of the phosphoric acid esters in the iso(thio)cyanate composition of the present disclosure may be 1 ppm or more, 5 ppm or more, 10 ppm or more, 50 ppm or more, 100 ppm or more, and more than 100 ppm, based on the mass of the iso(thio)cyanate compound. Where the total amount of the phosphoric acid ester compounds is less than 1 ppm, the total amount of the phosphoric acid ester compounds is too small, so that the effect of stabilizing the iso(thio)cyanate compound with the phosphoric acid ester compounds is sometimes not demonstrated. Further, the total amount of the phosphoric acid ester compounds in the iso(thio)cyanate composition of the present disclosure may be 25,000 ppm or less, 22,000 ppm or less, 20,000 ppm or less, 18,000 ppm or less, 10,000 ppm or less, 8,000 ppm or less, 5,000 ppm or less, 3,000 ppm or less, and 2,500 ppm or less, based on the mass of the iso(thio)cyanate compound. Where the total amount of the phosphoric acid ester compounds is more than 25,000 ppm, the optical component prepared using the iso(thio)cyanate composition sometimes becomes cloudy under the influence of moisture absorbed in the phosphoric acid ester compounds.

Further, from the viewpoint of stabilizing the iso(thio)cyanate compound, the total amount of the phosphoric acid ester compounds in the iso(thio)cyanate composition of the present disclosure may be 1 ppm or more, 10 ppm or more, 50 ppm or more, 100 ppm or more, and more than 100 ppm, based on the mass of the iso(thio)cyanate compound.

The total amount of the phosphoric acid ester compounds in the iso(thio)cyanate composition of the present disclosure may be 800 ppm or less, 500 ppm or less, 300 ppm or less, and 200 ppm or less, based on the mass of the iso(thio)cyanate compound.

From the viewpoint of improving the releasability from the mold at the time of producing the optical component, the total amount of the phosphoric acid ester compounds in the iso(thio)cyanate composition of the present disclosure may be 800 ppm or more, 1,000 ppm or more, 1,500 ppm or more, and 10,0000 ppm or more, based on the mass of the iso(thio)cyanate compound.

The total amount of the phosphoric acid ester compounds in the iso(thio)cyanate composition of the present disclosure may be 25,000 ppm or less, 20,000 ppm or less, 15,000 ppm or less, 10,000 ppm or less, 5,000 ppm or less, and 2,500 ppm or less, based on the mass of the iso(thio)cyanate compound.

The molar ratio of the phosphoric acid ester compound represented by general formula (1) to the phosphoric acid ester compound represented by general formula (2) may be from 30/70 to 70/30, from 35/65 to 65/35, and from 40/60 to 60/40. Where the molar ratio of the phosphoric acid ester compound represented by general formula (1) to the phosphoric acid ester compound represented by general formula (2) is from 30/70 to 70/30, stability of the iso(thio)cyanate compound is further improved and the coloration caused by the addition of the phosphoric acid ester compounds is also suppressed.

<Other Components>

The iso(thio)cyanate composition of the present disclosure may contain, if necessary, a compound other than the iso(thio)cyanate compound and the phosphoric acid ester compounds to the extent that the effect of the present disclosure is not impaired. Such additional compounds include an antioxidant, an ultraviolet absorber, and the like. These may be used singly or in combination of two or more thereof.

[Method for Stabilizing the Iso(Thio)Cyanate Compound]

The method for stabilizing the iso(thio)cyanate compound of the present disclosure includes a step of adding a phosphoric acid ester compound represented by general formula (1) and a phosphoric acid ester compound represented by general formula (2) to an iso(thio)cyanate compound having two or more iso(thio)cyanate groups in a molecule, the total added amount of the phosphoric acid ester compounds being 1 ppm to 25,000 ppm, based on the mass of the iso(thio)cyanate compound. With this method for stabilizing the iso(thio)cyanate compound of the present disclosure, the iso(thio)cyanate compound can be effectively stabilized.

The total addition amount of the iso(thio)cyanate compound, one phosphoric acid ester compound and the other phosphoric acid ester compound in the method for stabilizing the iso(thio)cyanate compound of the present disclosure is the same as the total amount of the iso(thio)cyanate compound, one phosphoric acid ester compound and the other phosphoric acid ester compound in the method for stabilizing the iso(thio)cyanate compound which has been explained in relation to the iso(thio)cyanate composition of the present disclosure. Therefore, the description thereof will be omitted. Further, the molar ratio of the phosphoric acid ester compound represented by general formula (1) and the phosphoric acid ester compound represented by general formula (2) in the method for stabilizing the iso(thio)cyanate compound of the present disclosure is also the same as the molar ratio explained in relation to the iso(thio)cyanate composition of the present disclosure. Therefore, the description thereof will be omitted.

[Method for Storing the Iso(Thio)Cyanate Compound]

In the method for storing the iso(thio)cyanate compound of the present disclosure, the iso(thio)cyanate compound stabilized by the method for stabilizing the iso(thio)cyanate compound of the present disclosure is stored for 24 h or more. According to the method for storing the iso(thio)cyanate compound of the present disclosure, the iso(thio)cyanate compound can be stored for 24 h or more and can be also stored for 4 weeks or more in a stabilized state. According to the method for storing the iso(thio)cyanate compound of the present disclosure, the upper limit of the period during which the iso(thio)cyanate compound can be stably stored is not particularly limited, but is, for example, 6 months.

[Resin Composition for Optical Component]

The resin composition for an optical component of the present disclosure can be obtained by using the iso(thio)cyanate composition of the present disclosure. As a result, it is possible to suppress the fabrication of the resin composition for an optical component using the iso(thio)cyanate composition deteriorated by the reaction of iso(thio)cyanate groups. Where a resin composition for an optical component is prepared using a deteriorated iso(thio)cyanate composition, an optical component prepared using the resin composition for an optical component may become cloudy in some cases.

<Active Hydrogen Compound>

The resin composition for an optical component of the present disclosure may be obtained by using the iso(thio)cyanate composition of the present disclosure and an active hydrogen compound having two or more active hydrogen groups. As a result, it is possible to obtain a resin composition for an optical component which makes it possible to prepare an optical component which is free of cloudiness and has a high refractive index. Examples of active hydrogen compounds having two or more active hydrogen groups include polythiol compounds, polyol compounds, polyamine compounds, and the like.

(Polythiol Compounds)

The polythiol compound can be exemplified by compounds obtained by esterification of a polyol compound and a thioglycolic acid, such as ethylene glycol bis(mercaptoacetate), diethylene glycol bis(mercaptoacetate), propanetriol tris(mercaptoacetate), propanediol bis(mercaptoacetate), butanediol di(mercaptoacetate), trimethylolpropane tris (mercaptoacetate), trimethylolpropane tris(mercaptopropionate), ethylene bis(hydroxyethyl sulfide) bis(mercaptoacetate), butanediol bis(mercaptoacetate), butanediol bis (mercaptopropionate), pentaerythritol tetrakis (mercaptoacetate), dipentaerythritol hexa(mercaptoacetate), ethylene glycol bis(mercaptopropionate), diethylene glycol bis(mercaptopropionate), trimethylolpropane bis(mercaptopropionate), and pentaerythritol tetrakis(mercaptopropionate);

aliphatic polythiol compounds or polythiol compounds having an alicyclic structure, such as ethanedithiol, propanedithiol, hexanedithiol, propanetrithiol, cyclohexanedithiol, dimethylpropanedithiol, dimethoxybutanedithiol, methylcyclohexanedithiol, bis(mercaptomethyl)cyclohexane, dimercaptopropanol, dimercaptopropyl methyl ether, dimercaptopropyl methyl ether, bis(mercaptomethyl)propanedithiol, bis(mercaptoethyl) ether, bis(mercaptoethyl) sulfide, bis(mercaptoethyl) disulfide, bis(mercaptomethyl) dithiane, bis[(mercaptoethyl)thio]mercaptopropane, and bis (mercaptomethyl) trithiaundecanedithiol; and aromatic polythiol compounds such as dimercaptobenzene, bis(mercaptomethyl)benzene, bis(mercaptoethyl)benzene, trimercaptobenzene, tris(mercaptomethyl)benzene, dimercaptobiphenyl, dimercaptobibenzyl, toluenedithiol, naphthalenedithiol, dimethylbenzenedithiol, anthracenedimethanethiol, di(p-methoxyphenyl)propanedithiol, diphenylpropanedithiol, phenylmethanedithiol, di(p-mercaptophenyl)pentane, and the like. These compounds may be used singly or in combination of two or more thereof.

(Polyol Compound)

The polyol compound can be exemplified by aliphatic polyols such as ethylene glycol, diethylene glycol, propylene glycol, dipropylene glycol, butylene glycol, neopentyl glycol, glycerin, trimethylolethane, trimethylolpropane, butanetriol, methyl glucoside, pentaerythritol, dipentaerythritol, tripentaerythritol, sorbitol, erythritol, threitol, ribitol, arabinitol, xylitol, allitol, mannitol, dulcitol, iditol, glycol, inositol, hexanetriol, triglycerol, diglylperol, triethylene glycol, polyethylene glycol, tris(hydroxyethyl) isocyanurate, cyclobutanediol, cyclopentanediol, cyclohexanediol, cycloheptanediol, cyclooctanediol, cyclohexanedimethanol, hydroxypropylcyclohexanol, tricyclodecanedimethanol, bicyclononanediol, dicyclohexanediol, tricyclododecanediol, bicyclononanedimethanol, tricyclododecanediethanol, hydroxypropyltricyclododecanol, spirooctanediol, butylcyclohexanediol, bicyclohexylidenediol, cyclohexanetriol, bis(hydroxyethyl)dithiane, maltitol, and lactitol;

aromatic polyols such as dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, and tetrabrom bisphenol A;

polyols including a sulfur atom such as di(hydroxyethyl) sulfide, bis(hydroxyethylmercapto)ethane, bis(hydroxyethyl) disulfide, dithianediol, bis(dihydroxypropyl) sulfide, tetrakis(hydroxythiabutyl)methane, bis(hydroxyphenyl) sulfone (trade name: BISPHENOL S), tetrabromobisphenol S, tetramethylbisphenol S, thiobis(tert-butylmethylphenol), and bis(hydroxyethylthioethyl)-cyclohexane; and polyalkylene oxide ethers of polyols, such as polyoxypropylene glyceryl ether, polyoxyethylene glyceryl ether, polyoxypropylene trimethylolpropyl ether, polyoxypropylene pentaerythritol ether, and the like. These compounds may be used singly or in combination of two or more thereof.

(Polyamine Compound)

The polyamine compound can be exemplified by diethyldiaminotoluene and the like.

It may have better that the active hydrogen compound having two or more active hydrogen groups be a polythiol compound. Specific examples of polythiol compounds include bis(mercaptomethyl)trithiaundecanedithiol, pentaerythritol tetrakis(3-mercaptopropionate), bis(mercaptoethylthio)mercaptopropane, trimethylolpropane tris(mercaptoacetate), trimethylolpropane tris(mercaptopropionate), butanediol bis(mercaptoacetate), butanediol bis(mercaptopropionate) and the like. These compounds may be used singly or in combination of two or more thereof. Among them, at least one selected from the group consisting of bis(mercaptomethyl)trithiaundecanedithiol, pentaerythritol tetrakis(3-mercaptopropionate), and bis(mercaptoethylthio) mercaptopropane may have better, and at least one selected from the group consisting of bis(mercaptomethyl)trithiaundecanedithiol and a combination of pentaerythritol tetrakis (3-mercaptopropionate) and bis(mercaptoethylthio)mercaptopropane may have better.

A combination of an iso(thio)cyanate and an active hydrogen compound is as described below.

(Other Components)

The resin composition for an optical component of the present disclosure may be composed only of the iso(thio)cyanate composition and the active hydrogen compound. However, the resin composition for an optical component of the present disclosure may include, if necessary, a compound other than the iso(thio)cyanate composition and the active hydrogen compound to the extent that the effect of the present disclosure is not impaired. Such a compound can be exemplified by an epoxy compound, an olefin compound, a carbonate compound, an ester compounds, a metal, a metal oxide, an organometallic compound, an inorganic material and the like. These compounds may be used singly or in combination of two or more thereof.

In addition, depending on the purpose, the polymerizable composition of the present disclosure may additionally include various substances such as a chain extender, a crosslinking agent, a light stabilizer, an ultraviolet absorber, an antioxidant, an oil soluble dye, a filler, a release agent, a bluing agent, and a fluorescent whitening agent. Furthermore, in order to adjust the reaction rate to a desired value, a known reaction catalyst which is used in the production of polyurethanes can be appropriately added to the polymerizable composition of the present disclosure.

[Optical component]

The optical component of the present disclosure is prepared using the resin composition for an optical component. For example, the optical component of the present disclosure can be obtained by cast-polymerizing the resin composition for an optical component of the present disclosure. Specifically, first, a resin composition for an optical component is prepared by mixing the iso(thio)cyanate composition of the present disclosure and an active hydrogen compound having two or more active hydrogen groups. Thereafter, the resin composition for an optical component is degassed, if necessary, and then the resin composition for an optical component is injected into a mold, and the resin composition for an optical component injected into the mold is polymerized. For example, a mold made of glass or metal is used as the mold. The polymerization time for polymerizing the resin composition for an optical component in the mold is, for example, 3 h to 96 h, and the polymerization temperature is, for example, 0° C. to 130° C. In order to improve the releasability of the optical component prepared by polymerizing the resin composition for an optical component from the mold, a release agent may be applied to the release surface of the mold, or a release agent may be added to the resin composition for an optical component.

In the optical component thus obtained, practically no cloudiness is observed. Further, the optical component can be advantageously used as an optical element such as a spectacle lens and a camera lens, and can be particularly advantageously used as a spectacle lens.

The spectacle lens of the present disclosure is composed of the optical component of the present disclosure. As a result, practically no cloudiness is observed in the spectacle lens of the present disclosure. Further, the spectacle lens of the present disclosure is suitably used particularly as a plastic lens for spectacles.

Further, if necessary, the spectacle lens of the present disclosure may be subjected to physical or chemical treatment such as surface polishing, antistatic treatment, hard coating treatment, antireflective coating treatment, dyeing treatment, and light control treatment in order to prevent reflection, impart high hardness, improve abrasion resistance, improve chemical resistance, impart resistance to cloudiness, impart design features and the like.

[Method for Producing the Spectacle Lens]

A method for producing the spectacle lens of the present disclosure may include:

a step 1 of mixing an iso(thio)cyanate compound having two or more iso(thio)cyanate groups in a molecule, a phosphoric acid ester compound represented by general formula (1), and a phosphoric acid ester compound represented by general formula (2), with a total amount of the phosphoric acid ester compounds being 1 ppm to 25,000 ppm, based on a mass of the iso(thio)cyanate compound;

a step 2 of mixing the mixture obtained in step 1, an active hydrogen compound having two or more active hydrogen groups, and a polymerization catalyst to obtain a resin composition; and a step 3 of injecting the resin composition into a mold for a lens and polymerizing the resin composition.

[Step 1]

In step 1, various substances such as an ultraviolet absorber, a bluing agent, a release agent, a chain extender, a crosslinking agent, a light stabilizer, an antioxidant, an oil soluble dye, a filler, and a fluorescent whitening agent may be added after mixing the iso(thio)cyanate compound and the phosphoric acid ester compounds. Among these additives, it may have better to add at least one selected from the group consisting of an ultraviolet absorber, a bluing agent, and a release agent.

Examples of the ultraviolet absorber include benzophenone compounds such as 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, and 2,2'-dihydroxy-4-methoxybenzophenone; benzotriazole compounds such as 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-di-t-amylphenyl)benzotriazole, 2-(2'-hydroxy-3',5'-di-t-butylphenyl)benzotriazole, 2-(2'-hydroxy-5'-t-butylphenyl)benzotriazole, 2-(2'-hydroxy-5'-t-octylphenyl)benzotriazole, and 2-(2'-hydroxy-4'-octyloxyphenyl)benzotriazole; and dibenzoylmethane, 4-tert-butyl-4'-methoxybenzoylmethane and the like. These compounds may be used singly or in combination of two or more thereof. The amount of the ultraviolet absorber may be 0.03% by mass to 6% by mass, 0.06% by mass to 3% by mass, and 0.1% by mass to 1.5% by mass, based on 100 parts by mass of the iso(thio)cyanate compound.

The bluing agent can be exemplified by blue and red dyes or pigments. The addition amount of the bluing agent to the iso(thio)cyanate compound may be 2 ppm to 20 ppm, 3 ppm to 35 ppm, and 6 ppm to 30 ppm.

Phosphoric acid esters can be advantageously used as the release agent, and examples thereof include phosphoric acid monoesters such as isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate, butylphenyl acid phosphate, and butoxyethyl acid phosphate; and phosphoric acid diesters such as diisopropyl acid phosphate, dibutyl acid phosphate, dioctyl acid phosphate, diisodecyl acid phosphate, bis(tridecyl acid phosphate), distearyl acid phosphate, dipropylphenyl acid phosphate, dibutylphenyl acid phosphate, dibutoxyethyl acid phosphate and the like. These compounds may be used singly or in combination of two or more thereof.

The addition amount of the release agent may be 0.01 parts by mass to 3 parts by mass, 0.05 parts by mass to 1 part by mass, and 0.1 parts by mass to 0.8 parts by mass, based on 100 parts by mass of the iso(thio)cyanate compound.

[Step 2]

In step 2, the order of mixing of the mixture obtained in step 1, the active hydrogen compound having two or more active hydrogen groups, and the polymerization catalyst is not particularly limited, but in order to prevent clouding and suppress the occurrence of clouding in the obtained spectacle lens, it may have better that the active hydrogen compound having two or more active hydrogen groups and the polymerization catalyst be mixed in advance and then the mixture obtained in step 1 be admixed thereto.

As the active hydrogen compound, the above-mentioned active hydrogen compound can be used. As for the compounding ratio of the polyiso(thio)cyanate compound and the active hydrogen compound, the molar ratio the iso(thio)cyanate groups to the active hydrogen group may be usually 0.5 to 2.0, and 0.95 to 1.05.

Combinations of the iso(thio)cyanate and the active hydrogen compound may be described hereinbelow.

(i) A combination of bis(isocyanatomethyl)benzene and bis(mercaptomethyl)-3,6,9-trithiaundecane-1,11-dithiol;

(i-1) a combination of 1,3-bis(isocyanatomethyl)benzene and a mixture of 5,7-bis(mercaptomethyl)-3,6,9-trithiaundecane-1,11-dithiol, 4,7-bis(mercaptomethyl)-3,6,9-trithiaundecane-1,11-dithiol, and 4,8-bis(mercaptomethyl)-3,6,9-trithiaundecane-1,11-dithiol;

(i-2) a combination of 1,4-bis(isocyanatomethyl)benzene and a mixture of 5,7-bis(mercaptomethyl)-3,6,9-trithiaundecane-1,11-dithiol, 4,7-bis(mercaptomethyl)-3,6,9-trithiaundecane-1,11-dithiol, and 4,8-bis(mercaptomethyl)-3,6,9-trithiaundecane-1,11-dithiol;

(ii) a combination of bis(4-isocyanatocyclohexyl)methane and bis(mercaptomethyl)-3,6,9-trithiaundecane-1,11-dithiol;

(ii-1) a combination of bis(4-isocyanatocyclohexyl)methane and a mixture of 5,7-bis(mercaptomethyl)-3,6,9-trithiaundecane-1,11-dithiol, 4,7-bis(mercaptomethyl)-3,6,9-trithiaundecane-1,11-dithiol, and 4,8-bis(mercaptomethyl)-3,6,9-trithiaundecane-1,11-dithiol; and (iii) a combination of norbornanediylbis(methylene) diisocyanate, pentaerythritol tetrakis(3-mercaptopropionate), and 1,2-bis(2-mercaptoethylthio)-3-mercaptopropane.

The polymerization catalyst can be exemplified by an organometallic compound, an amine compound and the like.

Examples of the organometallic compound include organotin, copper oleate, copper acetylacetonate, iron acetylacetonate, iron naphthenate, iron lactate, iron citrate, iron gluconate, 2-ethylhexyl titanate and the like.

Among the organometallic compounds, organotin may have better. Examples of the organotin include dimethyltin dichloride, dibutyltin dichloride, dioctyltin dichloride, dimethyltin dibromide, dibutyltin dibromide, dioctyltin dibromide, dioctyltin difluoride, and the like. These catalysts may be used singly or in combination of two or more thereof.

Examples of the amine compound include triethylenediamine, hexamethylenetetramine, N,N-dimethyloctylamine, N,N,N',N'-tetramethyl-1,6-diaminohexane, 4,4'-trimethylene bis(1-methylpiperidine), and 1,8-diazabicyclo-(5,4,0)-7-undecene.

Among these polymerization catalysts, dimethyltin dichloride and dibutyltin dichloride may have better.

The addition amount of the polymerization catalyst may be 0.001% by mass to 2.0% by mass, 0.005% by mass to 1.5% by mass, and 0.01% by mass to 1.0% by mass, based on the total amount of the resin composition obtained in step 2.

[Step 3]

In step 3, the resin composition is injected into a mold for a lens and polymerized.

The mold for a lens can be exemplified by a mold formed by combining a mold made of glass or a metal and a tape or a gasket, and an example of mold is formed by combining a glass mold and a tape or a gasket.

The polymerization conditions can be appropriately set according to the polymerization composition.

The polymerization initiation temperature may be usually 0° C. to 50° C. and 20° C. to 40° C. It may have better to raise the temperature from the polymerization initiation temperature and then to heat and cure the composition. For example, the elevated temperature may be usually 110° C. to 130° C.

After completion of the polymerization, the spectacle lens may be removed from the mold and subjected to annealing treatment. The temperature of the annealing treatment may be 100° C. to 150° C.

In the present disclosure, the examples, amounts and various physical properties of the above-described components may be arbitrarily combined with those described as exemplary or preferred ranges in the detailed description of the disclosed embodiments.

Further, where the composition described in the examples is adjusted to the composition described in the detailed description of the disclosed embodiments, the disclosure can be carried out in the same manner as in the examples over the entire composition range claimed.

EXAMPLES

The present disclosure will be described hereinbelow more specifically with reference to Examples, but the present disclosure is not limited to these Examples.

Appearance tests of the iso(thio)cyanate compositions of Examples and Comparative Examples after storage and appearance tests of optical components prepared using the stored iso(thio)cyanate compositions were carried out.

(Appearance Test of Iso(Thio)Cyanate Compositions after Storage)

The iso(thio)cyanate compositions of the Examples and Comparative Examples were prepared and placed in a sealable container, the air in the container was replaced with nitrogen, and the container was sealed and stored for 4 weeks at room temperature. Then, the appearance of the iso(thio)cyanate compositions of Examples and Comparative Examples after storage for 4 weeks was observed, and the presence or absence of clouding of the iso(thio)cyanate compositions of Examples and Comparative Examples was investigated.

(Appearance Test of Optical Components)

Optical components were prepared using the iso(thio)cyanate compositions of Examples and Comparative Examples after storage for 4 weeks, and the appearance of the optical components was observed to investigate the presence or absence of clouding of the optical components.

Next, iso(thio)cyanate compositions and optical components of Examples and Comparative Examples were prepared in the following manner.

Example 1

A total of 10 ppm of a mixture (molar ratio: 55/45) of butoxyethyl acid phosphate (phosphoric acid ester compound represented by formula (3)) and dibutoxyethyl acid phosphate (phosphoric acid ester compound represented by formula (4)) was added to 1,3-bis(isocyanatomethyl)benzene which is a polyisocyanate compound, followed by stirring for 10 min to prepare the iso(thio)cyanate composition of Example 1. Thereafter, the iso(thio)cyanate composition of Example 1 was placed in a sealable container, the air in the container was replaced with nitrogen, and the container was sealed and stored at room temperature to prepare the iso(thio)cyanate composition stored for 4 weeks.

A total of 0.01 parts by mass of dimethyltin dichloride as a catalyst, 0.14 parts by mass of JP-506H (manufactured by Johoku Chemical Co., Ltd.) as an internal release agent, and 0.45 parts by mass of SEESORB 707 (manufactured by Shipro Kasei Kaisha, Ltd.) as an ultraviolet absorber were added to and stirred with 50.60 parts by mass of the iso(thio)cyanate composition of Example 1 stored for 4 weeks. After the added compounds were dissolved in the iso(thio)cyanate composition of Example 1, 49.40 parts by mass of a mixture—a polythiol compound—of 5,7-bis(mercaptomethyl)-3,6,9-trithiaundecane-1,11-dithiol, 4,7-bis (mercaptomethyl)-3,6,9-trithiaundecane-1,11-dithiol, and 4,8-bis(mercaptomethyl)-3,6,9-trithiaundecane-1,11-dithiol was added, followed by mixing for 30 min under a reduced pressure of about 133 Pa to obtain a resin composition for an optical component. This resin composition for an optical component was injected into a mold for a lens consisting of a glass mold and a resin gasket prepared in advance, and the temperature was gradually raised from 20° C. to 120° C. in an electric furnace over approximately 22 h and kept at 120° C. for 3 h to polymerize the resin composition for an optical component. After completion of the polymerization, the resin gasket was removed, and the optical component (spectacle lens) prepared using the iso(thio)cyanate composition of Example 1 stored for 4 weeks was removed from the glass mold.

Example 2

An iso(thio)cyanate composition of Example 2 stored for 4 weeks and an optical component prepared using the iso(thio)cyanate composition were obtained in the same manner as in Example 1, except that the addition amount of the mixture of butoxyethyl acid phosphate and dibutoxyethyl acid phosphate was changed from 10 ppm to 120 ppm.

Example 3

An iso(thio)cyanate composition of Example 3 stored for 4 weeks and an optical component prepared using the iso(thio)cyanate composition were obtained in the same manner as in Example 1, except that the addition amount of the mixture of butoxyethyl acid phosphate and dibutoxyethyl acid phosphate was changed from 10 ppm to 500 ppm.

Example 4

An iso(thio)cyanate composition of Example 4 stored for 4 weeks and an optical component prepared using the iso(thio)cyanate composition were obtained in the same manner as in Example 1, except that the addition amount of the mixture of butoxyethyl acid phosphate and dibutoxyethyl acid phosphate was changed from 10 ppm to 2,000 ppm.

Example 5

An iso(thio)cyanate composition of Example 5 stored for 4 weeks and an optical component prepared using the iso(thio)cyanate composition were obtained in the same manner as in Example 1, except that the addition amount of the mixture of butoxyethyl acid phosphate and dibutoxyethyl acid phosphate was changed from 10 ppm to 3,000 ppm.

Example 6

An iso(thio)cyanate composition of Example 6 stored for 4 weeks and an optical component prepared using the iso(thio)cyanate composition were obtained in the same manner as in Example 1, except that the addition amount of the mixture of butoxyethyl acid phosphate and dibutoxyethyl acid phosphate was changed from 10 ppm to 20,000 ppm and the internal release agent was not added.

Comparative Example 1

An iso(thio)cyanate composition of Comparative Example 1 stored for 4 weeks and an optical component prepared using the iso(thio)cyanate composition were obtained in the same manner as in Example 1, except that the mixture of butoxyethyl acid phosphate and dibutoxyethyl acid phosphate was not added.

Comparative Example 2

An iso(thio)cyanate composition of Comparative Example 2 stored for 4 weeks and an optical component prepared using the iso(thio)cyanate composition were obtained in the same manner as in Example 1, except that the addition amount of the mixture of butoxyethyl acid phosphate and dibutoxyethyl acid phosphate was changed from 10 ppm to 30,000 ppm and the internal release agent was not added.

Comparative Example 3

An iso(thio)cyanate composition of Comparative Example 3 stored for 4 weeks and an optical component prepared using the iso(thio)cyanate composition were obtained in the same manner as in Example 1, except that 500 ppm of dibutyl phosphate was added instead of adding 10 ppm of the mixture of butoxyethyl acid phosphate and dibutoxyethyl acid phosphate.

Comparative Example 4

An iso(thio)cyanate composition of Comparative Example 4 stored for 4 weeks and an optical component prepared using the iso(thio)cyanate composition were obtained in the same manner as in Example 1, except that 500 ppm of phenol was added instead of adding 10 ppm of the mixture of butoxyethyl acid phosphate and dibutoxyethyl acid phosphate.

(Results)

The evaluation results of the iso(thio)cyanate compositions of Examples and Comparative Examples are shown in Table 1.

Example 7

A total of 10 ppm of a mixture (molar ratio: 55/45) of butoxyethyl acid phosphate (phosphoric acid ester compound represented by formula (3)) and dibutoxyethyl acid phosphate (phosphoric acid ester compound represented by formula (4)) was added to norbornanediylbis(methylene) diisocyanate (also called bis(isocyanatomethyl)bicyclo[2.2.1]heptane), which is a polyisocyanate compound, followed by stirring for 10 min to prepare the iso(thio)cyanate composition of Example 1. Thereafter, the iso(thio)cyanate composition of Example 7 was placed in a sealable container, the air in the container was replaced with nitrogen, and the container was sealed and stored at room temperature to prepare the iso(thio)cyanate composition of Example 7 stored for 4 weeks.

A total of 0.14 parts by mass of JP-506H (manufactured by Johoku Chemical Co., Ltd.) as an internal release agent, and 0.45 parts by mass of SEESORB 707 (manufactured by Shipro Kasei Kaisha, Ltd.) as an ultraviolet absorber were added to and stirred with 50.60 parts by mass of the iso(thio)cyanate composition of Example 7 stored for 4 weeks, and the added compounds were dissolved in the iso(thio)cyanate composition of Example 7.

A total of 25.50 parts by mass of pentaerythritol tetrakis (3-mercaptopropionate) as a polythiol compound, 24.22 parts by mass of 1,2-bis(2-mercaptoethylthio)-3-mercaptopropane, and 0.01 parts by mass of dimethyltin dichloride were mixed, followed by mixing for 30 min under a reduced pressure of about 133 Pa. The resultant mixture was then mixed with the aforementioned iso(thio)cyanate composition to obtain a resin composition. This resin composition was injected into a mold for a lens consisting of a glass mold and a resin gasket prepared in advance, and the temperature was gradually raised from 20° C. to 120° C. in an electric furnace over approximately 22 h and kept at 120° C. for 3 h to polymerize the resin composition. After completion of the polymerization, the resin gasket was removed, and the optical component (spectacle lens) prepared using the iso (thio)cyanate composition of Example 7 stored for 4 weeks was removed from the glass mold.

Example 8

An iso(thio)cyanate composition of Example 8 stored for 4 weeks and an optical component prepared using the iso(thio)cyanate composition were obtained in the same manner as in Example 7, except that the addition amount of the mixture of butoxyethyl acid phosphate and dibutoxyethyl acid phosphate was changed from 10 ppm to 120 ppm.

Example 9

An iso(thio)cyanate composition of Example 9 stored for 4 weeks and an optical component prepared using the iso(thio)cyanate composition were obtained in the same manner as in Example 7, except that the addition amount of the mixture of butoxyethyl acid phosphate and dibutoxyethyl acid phosphate was changed from 10 ppm to 500 ppm.

Example 10

An iso(thio)cyanate composition of Example 10 stored for 4 weeks and an optical component prepared using the iso(thio)cyanate composition were obtained in the same manner as in Example 7, except that the addition amount of the mixture of butoxyethyl acid phosphate and dibutoxyethyl acid phosphate was changed from 10 ppm to 2,000 ppm and the internal release agent was not added.

Example 11

An iso(thio)cyanate composition of Example 11 stored for 4 weeks and an optical component prepared using the iso(thio)cyanate composition were obtained in the same manner as in Example 7, except that the addition amount of the mixture of butoxyethyl acid phosphate and dibutoxyethyl acid phosphate was changed from 10 ppm to 3,000 ppm and the internal release agent was not added.

Example 12

An iso(thio)cyanate composition of Example 12 stored for 4 weeks and an optical component prepared using the iso(thio)cyanate composition were obtained in the same manner as in Example 7, except that the addition amount of the mixture of butoxyethyl acid phosphate and dibutoxyethyl acid phosphate was changed from 10 ppm to 20,000 ppm and the internal release agent was not added.

Comparative Example 5

An iso(thio)cyanate composition of Comparative Example 5 stored for 4 weeks and an optical component prepared using the iso(thio)cyanate composition were obtained in the same manner as in Example 7, except the mixture of butoxyethyl acid phosphate and dibutoxyethyl acid phosphate was not added.

Comparative Example 6

An iso(thio)cyanate composition of Comparative Example 6 stored for 4 weeks and an optical component prepared using the iso(thio)cyanate composition were obtained in the same manner as in Example 7, except that the addition amount of the mixture of butoxyethyl acid phosphate and dibutoxyethyl acid phosphate was changed from 10 ppm to 30,000 ppm and the internal release agent was not added.

Comparative Example 7

An iso(thio)cyanate composition of Comparative Example 7 stored for 4 weeks and an optical component prepared using the iso(thio)cyanate composition were obtained in the same manner as in Example 7, except that 500 ppm of dibutyl phosphate was added instead of adding 10 ppm of the mixture of butoxyethyl acid phosphate and dibutoxyethyl acid phosphate.

Comparative Example 8

An iso(thio)cyanate composition of Comparative Example 8 stored for 4 weeks and an optical component prepared using the iso(thio)cyanate composition were obtained in the same manner as in Example 7, except that 500 ppm of phenol was added instead of adding 10 ppm of the mixture of butoxyethyl acid phosphate and dibutoxyethyl acid phosphate.

(Results)

The evaluation results of the iso(thio)cyanate compositions of Examples and Comparative Examples are shown in Table 2.

TABLE 1

|  | Iso(thio)cyanate | Additive | Addition concentration (ppm) | Appearance of iso(thio)cyanate composition | Polythiol compound | Appearance of optical component |
|---|---|---|---|---|---|---|
| Example 1 | I-1 | P-1 | 10 | Colorless, transparent | T-1 | Colorless, transparent |
| Example 2 | I-1 | P-1 | 120 | Colorless, transparent | T-1 | Colorless, transparent |
| Example 3 | I-1 | P-1 | 500 | Colorless, transparent | T-1 | Colorless, transparent |
| Example 4 | I-1 | P-1 | 2,000 | Colorless, transparent | T-1 | Colorless, transparent |

TABLE 1-continued

| | Iso(thio)cyanate | Additive | Addition concentration (ppm) | Appearance of iso(thio)cyanate composition | Polythiol compound | Appearance of optical component |
|---|---|---|---|---|---|---|
| Example 5 | I-1 | P-1 | 3,000 | Colorless, transparent | T-1 | Colorless, transparent |
| Example 6 | I-1 | P-1 | 20,000 | Colorless, transparent | T-1 | Colorless, transparent |
| Comparative Example 1 | I-1 | P-1 | 0 | Cloudy | T-1 | Cloudy |
| Comparative Example 2 | I-1 | P-1 | 30,000 | Bubbles are generated | T-1 | Cloudy |
| Comparative Example 3 | I-1 | P-2 | 20,000 | Colorless, transparent | T-1 | Cloudy |
| Comparative Example 4 | I-1 | P-3 | 20,000 | Cloudy | T-1 | Cloudy |

TABLE 2

| | Iso(thio)cyanate | Additive | Addition concentration (ppm) | Appearance of iso(thio)cyanate composition | Polythiol compound | Appearance of optical component |
|---|---|---|---|---|---|---|
| Example 7 | I-2 | P-1 | 10 | Colorless, transparent | T-2/T-3 | Colorless, transparent |
| Example 8 | I-2 | P-1 | 120 | Colorless, transparent | T-2/T-3 | Colorless, transparent |
| Example 9 | I-2 | P-1 | 500 | Colorless, transparent | T-2/T-3 | Colorless, transparent |
| Example 10 | I-2 | P-1 | 2,000 | Colorless, transparent | T-2/T-3 | Colorless, transparent |
| Example 11 | I-2 | P-1 | 3,000 | Colorless, transparent | T-2/T-3 | Colorless, transparent |
| Example 12 | I-2 | P-1 | 20,000 | Colorless, transparent | T-2/T-3 | Colorless, transparent |
| Comparative Example 5 | I-2 | P-1 | 0 | Cloudy | T-2/T-3 | Cloudy |
| Comparative Example 6 | I-2 | P-1 | 30,000 | Bubbles are generated | T-2/T-3 | Cloudy |
| Comparative Example 7 | I-2 | P-2 | 500 | Colorless, transparent | T-2/T-3 | Cloudy |
| Comparative Example 8 | I-2 | P-3 | 500 | Cloudy | T-2/T-3 | Cloudy |

The following notations are used in the tables.
P-1: a mixture of butoxyethyl acid phosphate and dibutoxyethyl acid phosphate;
P-2: dibutyl phosphate;
P-3: phenol;
I-1: 1,3-bis(isocyanatomethyl)benzene;
I-2: norbornanediylbis(methylene) diisocyanate;
T-1: a mixture including 5,7-bis(mercaptomethyl)-3,6,9-trithiaundecane-1,11-dithiol, 4,7-bis(mercaptomethyl)-3,6,9-trithiaundecane-1,11-dithiol, and 4,8-bis(mercaptomethyl)-3,6,9-trithiaundecane-1,11-dithiol;
T-2: pentaerythritol tetrakis(3-mercaptopropionate);
T-3: 1,2-bis(2-mercaptoethylthio)-3-mercaptopropane.

(1) By comparing Examples 1 to 6 with Comparative Examples 1 to 4, it was found that the iso(thio)cyanate compound can be stabilized for at least 4 weeks by adding specific amounts of the phosphoric acid ester compound represented by general formula (1) and the phosphoric acid ester compound represented by general formula (2) to the iso(thio)cyanate compound.

(2) In the iso(thio)cyanate composition of Comparative Example 1, the phosphoric acid ester was not added. This is apparently why the iso(thio)cyanate composition stored for 4 weeks became cloudy and the optical component prepared using the iso(thio)cyanate composition also became cloudy.

(3) In the iso(thio)cyanate composition of Comparative Example 2, the addition amount of the phosphoric acid ester compounds was much higher than 25,000 ppm. This is apparently why bubbles were generated in the iso(thio)cyanate composition stored for 4 weeks and the optical component prepared using the iso(thio)cyanate composition became cloudy.

(4) In the iso(thio)cyanate compositions of Comparative Examples 3 and 4, dibutyl phosphate and phenol conventionally used as stabilizers for isocyanate compounds were added in place of the phosphoric acid esters, but the resultant iso(thio)cyanate composition stored for 4 weeks became cloudy and the optical component prepared using the iso(thio)cyanate composition also became cloudy. From this, it was found that the phosphoric acid ester compounds have a superior ability to stabilize the iso(thio)cyanate compound as compared with the conventional stabilizers.

(5) By comparing Examples 7 to 12 with Comparative Examples 5 to 8, it was found that the iso(thio)cyanate compound can be stabilized for at least 4 weeks by adding specific amounts of the phosphoric acid ester compound represented by general formula (1) and the phosphoric acid ester compound represented by general formula (2) to the iso(thio)cyanate compound.

(6) In the iso(thio)cyanate composition of Comparative Example 5, the phosphoric acid ester was not added. This is apparently why the iso(thio)cyanate composition stored for 4 weeks became cloudy and the optical component prepared using the iso(thio)cyanate composition also became cloudy.

(7) In the iso(thio)cyanate composition of Comparative Example 6, the addition amount of the phosphoric acid ester compounds was much higher than 25,000 ppm. This is apparently why bubbles were generated in the iso(thio) cyanate composition stored for 4 weeks and the optical component prepared using the iso(thio)cyanate composition became cloudy.

(8) In the iso(thio)cyanate compositions of Comparative Examples 7 and 8, dibutyl phosphate and phenol conventionally used as stabilizers for isocyanate compounds were added in place of the phosphoric acid esters, but the resultant iso(thio)cyanate composition stored for 4 weeks became cloudy and the optical component prepared using the iso (thio)cyanate composition also became cloudy. From this, it was found that the phosphoric acid ester compounds have a superior ability to stabilize the iso(thio)cyanate compound as compared with the conventional stabilizers.

Finally, the embodiment of the present disclosure is summarized.

One embodiment of the present disclosure is an iso(thio) cyanate composition for an optical component, comprising an iso(thio)cyanate compound having two or more iso(thio) cyanate groups in a molecule, a phosphoric acid ester compound represented by the following general formula (1), and a phosphoric acid ester compound represented by the following general formula (2), wherein the total amount of the phosphoric acid ester compounds is 1 ppm to 25,000 ppm, based on a mass of the iso(thio)cyanate compound,

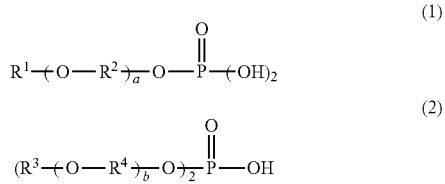

wherein, in general formula (1) and general formula (2), $R^1$ and $R^3$ each independently represent a $C_4$ to $C_{12}$ alkyl group, $R^2$ and $R^4$ each independently represent a $C_1$ to $C_4$ alkylene group, and a and b each independently represent an integer of 0 to 2.

According to the embodiment, an iso(thio)cyanate composition having excellent storage stability can be obtained.

Another embodiment of the present disclosure is a method for producing a spectacle lens, comprising:

a step 1 of mixing an iso(thio)cyanate compound having two or more iso(thio)cyanate groups in a molecule, a phosphoric acid ester compound represented by the following general formula (1), and a phosphoric acid ester compound represented by the following general formula (2), with a total amount of the phosphoric acid ester compounds being 1 ppm to 25,000 ppm, based on a mass of the iso(thio) cyanate compound;

a step 2 of mixing the mixture obtained in step 1, an active hydrogen compound having two or more active hydrogen groups, and a polymerization catalyst to obtain a resin composition; and a step 3 of injecting the resin composition into a mold for a lens and polymerizing the resin composition.

According to the embodiment, since the iso(thio)cyanate composition having excellent storage stability can be obtained in step 1, the occurrence of clouding in a spectacle lens can be prevented.

The embodiments disclosed herein are exemplary in all respects and are not restrictive. The scope of the present disclosure is defined by the claims, rather than by the description above, and the scope is intended to include meanings equivalent to claims and all changes within the scope.

The invention claimed is:

1. An iso(thio)cyanate composition for an optical component, the iso(thio)cyanate composition comprising:
   an iso(thio)cyanate compound including at least one compound selected from the group consisting of a compound having two or more iso(thio)cyanate groups and an aromatic ring in a molecule, and norbornanediylbis (methylene) diisocyanate;
   a phosphoric acid ester compound represented by the following general formula (1); and
   phosphoric acid ester compound represented by the following general formula (2),
   wherein:
   a total amount of the phosphoric acid ester compounds is 1 ppm or greater and less than 2,500 ppm, based on a mass of the iso(thio)cyanate compound,
   a molar ratio of the phosphoric acid ester compound represented by general formula (1) and the phosphoric acid ester compound represented by general formula (2) is 30/70 to 70/30, and
   general formula (1) and general formula (2) are:

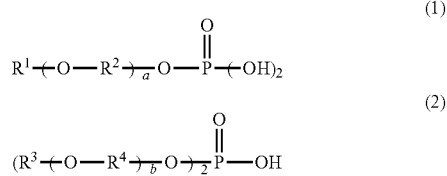

wherein, in general formula (1) and general formula (2), $R^1$ and $R^3$ each independently represent a $C_4$ to $C_{12}$ alkyl group, $R^2$ and $R^4$ each independently represent a $C_1$ to $C_4$ alkylene group, and a and b each independently represent an integer of 0 to 2.

2. The iso(thio)cyanate composition according to claim 1, wherein:
   the phosphoric acid ester compound represented by general formula (1) is a phosphoric acid ester compound represented by the following formula (3); and
   the phosphoric acid ester compound represented by general formula (2) is a phosphoric acid ester compound represented by the following formula (4):

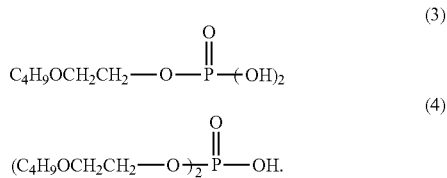

3. The iso(thio)cyanate composition according to claim 1, wherein the iso(thio)cyanate compound is at least one selected from the group consisting of phenylene diisocyanate, methylphenylene diisocyanate, bis(isocyanatomethyl)benzene, mesitylene triisocyanate, bis(isocyanatopropyl)benzene, diphenylmethane diisocyanate, diisocyanate naphthalene, and (dimethylbiphenylylene) diisocyanate.

4. A resin composition for an optical component, comprising the iso(thio)cyanate composition according to claim 1.

5. The resin composition according to claim 4, wherein the resin composition further comprises an active hydrogen compound having two or more active hydrogen groups.

6. The resin composition according to claim 5, wherein the active hydrogen compound is a polythiol compound.

7. An optical component comprising the resin composition according to claim 5.

8. A spectacle lens comprising the optical component according to claim 7.

9. A method for producing a spectacle lens, the method comprising:
a step 1 of mixing:
(i) an iso(thio)cyanate compound including at least one compound selected from the group consisting of a compound having two or more iso(thio)cyanate groups and an aromatic ring in a molecule, and norbornanediylbis(methylene) diisocyanate,
(ii) a phosphoric acid ester compound represented by the following general formula (1), and
(iii) a phosphoric acid ester compound represented by the following general formula (2)
to obtain a mixture in which:
a total amount of the phosphoric acid ester compounds is 1 ppm or greater and less than 2,500 ppm, based on a mass of the iso(thio)cyanate compound, and
a molar ratio of the phosphoric acid ester compound represented by general formula (1) and the phosphoric acid ester compound represented by general formula (2) is 30/70 to 70/30;
a step 2 of mixing the mixture obtained in step 1, an active hydrogen compound having two or more active hydrogen groups, and a polymerization catalyst, and obtaining a resin composition; and
a step 3 of injecting the resin composition into a mold for a spectacle lens and polymerizing the resin composition,
wherein general formula (1) and general formula (2) are:

$$R^1\!\!-\!\!(\!\!O\!\!-\!\!R^2\!\!)_a\!\!-\!\!O\!\!-\!\!\overset{\overset{\displaystyle O}{\|}}{P}\!\!-\!\!(OH)_2 \quad (1)$$

$$(R^3\!\!-\!\!(\!\!O\!\!-\!\!R^4\!\!)_b\!\!-\!\!O\!\!)_2\!\!-\!\!\overset{\overset{\displaystyle O}{\|}}{P}\!\!-\!\!OH \quad (2)$$

wherein, in general formula (1) and general formula (2), $R^1$ and $R^3$ each independently represent a $C_4$ to $C_{12}$ alkyl group, $R^2$ and $R^4$ each independently represent a $C_1$ to $C_4$ alkylene group, and a and b each independently represent an integer of 0 to 2.

10. The method for producing a spectacle lens according to claim 9, wherein in step 2, the active hydrogen compound having two or more active hydrogen groups and the polymerization catalyst are mixed in advance and then mixed with the mixture obtained in step 1.

11. The method for producing a spectacle lens according to claim 9, wherein in step 1, at least one selected from the group consisting of an ultraviolet absorber, a bluing agent, and a release agent, is further added.

12. The method for producing a spectacle lens according to claim 9, wherein:
the iso(thio)cyanate compound comprises 1,3-bis(isocyanatomethyl)benzene; and
the active hydrogen compound includes 5,7-bis(mercaptomethyl)-3,6,9-trithiaundecane-1,11-dithiol, 4,7-bis(mercaptomethyl)-3,6,9-trithiaundecane-1,11-dithiol, and 4,8-bis(mercaptomethyl)-3,6,9-trithiaundecane-1,11-dithiol.

13. A method for storing an isocyanate compound having two or more isocyanate groups in a molecule, the method comprising:
storing the isocyanate compound in an isocyanate composition for twenty four hours or more without a polythiol compound or a polyol compound, the isocyanate composition comprising:
the isocyanate compound;
a phosphoric acid ester compound represented by the following general formula (1); and
a phosphoric acid ester compound represented by the following general formula (2);
wherein:
the isocyanate compound is at least one selected from the group consisting of bis(isocyanatomethyl)benzene, bis(isocyanatomethyl)cyclohexane, bis(4-isocyanatocyclohexyl)methane, isophorone diisocyanate, norbornanediylbis(methylene) diisocyanate, and bis(isocyanatomethyl) dithiane;
a total amount of the phosphoric acid ester compounds is 1 ppm or greater and less than 2,500 ppm, based on a mass of the isocyanate compound,
a molar ratio of the phosphoric acid ester compound represented by general formula (1) and the phosphoric acid ester compound represented by general formula (2) is 30/70 to 70/30, and
general formula (1) and general formula (2) are:

$$R^1\!\!-\!\!(\!\!O\!\!-\!\!R^2\!\!)_a\!\!-\!\!O\!\!-\!\!\overset{\overset{\displaystyle O}{\|}}{P}\!\!-\!\!(OH)_2 \quad (1)$$

$$(R^3\!\!-\!\!(\!\!O\!\!-\!\!R^4\!\!)_b\!\!-\!\!O\!\!)_2\!\!-\!\!\overset{\overset{\displaystyle O}{\|}}{P}\!\!-\!\!OH \quad (2)$$

wherein, in general formula (1) and general formula (2), $R^1$ and $R^3$ each independently represent a C4 to C12 alkyl group, $R^2$ and $R^4$ each independently represent a C1 to C4 alkylene group, and a and b each independently represent an integer of 0 to 2.

14. The method for storing an isocyanate compound according to claim 13, wherein:
the phosphoric acid ester compound represented by general formula (1) is a phosphoric acid ester compound represented by the following formula (3); and
the phosphoric acid ester compound represented by general formula (2) is a phosphoric acid ester compound represented by the following formula (4):

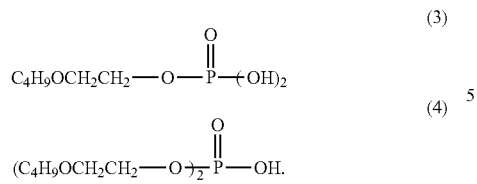
15. The method for storing an isocyanate compound according to claim 13, wherein the isocyanate composition comprises bis(isocyanatomethyl)benzene.
* * * * *